United States Patent [19]

Watanabe et al.

[11] 4,082,832
[45] Apr. 4, 1978

[54] TREATMENT OF RAW MATERIALS CONTAINING TITANIUM

[75] Inventors: Morio Watanabe, Amagasaki; Sanji Nishimura, Kyoto, both of Japan

[73] Assignee: Solex Research Corporation, Osaka, Japan

[21] Appl. No.: 680,928

[22] Filed: Apr. 27, 1976

[30] Foreign Application Priority Data

| | | |
|---|---|---|
| May 6, 1975 | Japan | 50-55048 |
| Jul. 21, 1975 | Japan | 50-89433 |
| Dec. 4, 1975 | Japan | 50-144861 |
| Jan. 16, 1976 | Japan | 51-3939 |

[51] Int. Cl.² ......................................... C01G 23/04
[52] U.S. Cl. .................................... 423/70; 423/49; 423/54; 423/63; 423/82; 423/85; 423/139; 423/146; 423/531; 423/616
[58] Field of Search ............. 423/49, 54, 63, 70, 423/82, 85, 139, 558, 615, 616, 531; 75/101 R, 101 BE, 121

[56] References Cited

U.S. PATENT DOCUMENTS

| | | | |
|---|---|---|---|
| 3,025,135 | 3/1962 | Kenworthy | 423/70 |
| 3,067,010 | 12/1962 | Long et al. | 423/70 |
| 3,479,378 | 11/1969 | Orlandini | 423/49 |
| 3,725,527 | 4/1973 | Yamamura | 423/70 |
| 3,875,285 | 4/1975 | Nyman | 423/54 |
| 3,976,475 | 8/1976 | Markland | 423/63 |

FOREIGN PATENT DOCUMENTS

| | | | |
|---|---|---|---|
| 970,885 | 9/1964 | United Kingdom | 423/70 |

Primary Examiner—O. R. Vertiz
Assistant Examiner—Brian E. Hearn
Attorney, Agent, or Firm—Toren, McGeady and Stanger

[57] ABSTRACT

Production of titanium dioxide which is characterized by recovery of reusable $H_2SO_4$, highly pure Fe oxide and hydroxide and fractional recovery of Mn, V and Cr, etc., from $FeSO_4 \cdot nH_2O$ and waste acid of 20 - 40% $H_2SO_4$ containing abundant heavy metallic ions, which are by-produced in the production of $TiO_2$ by dissolution of Ti raw materials such as ilmenite, steel production slag, such as electric furnace slag, convertor slag with $H_2SO_4$.

7 Claims, 20 Drawing Figures

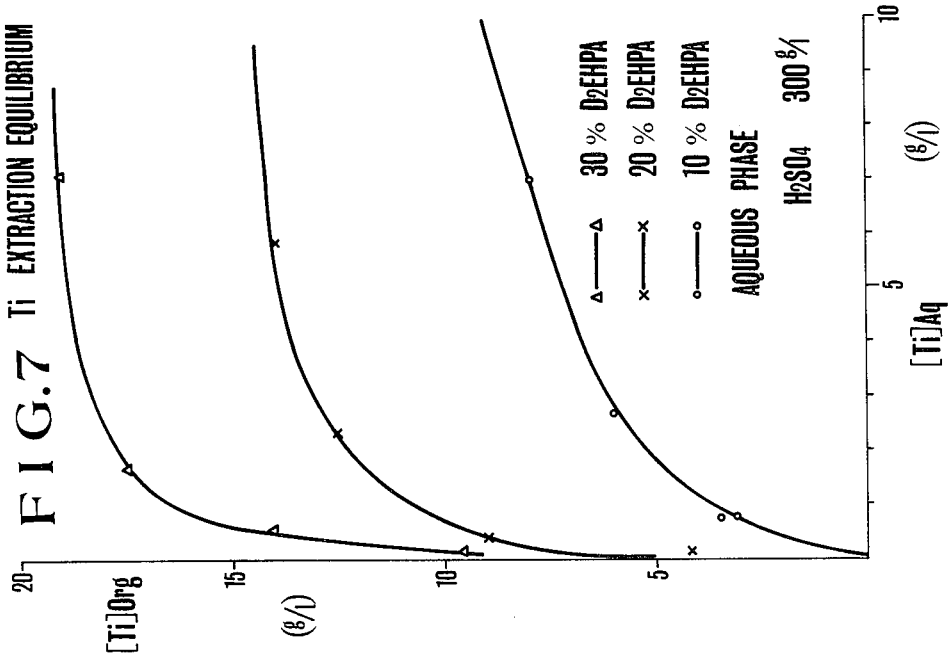
FIG. 7 Ti EXTRACTION EQUILIBRIUM
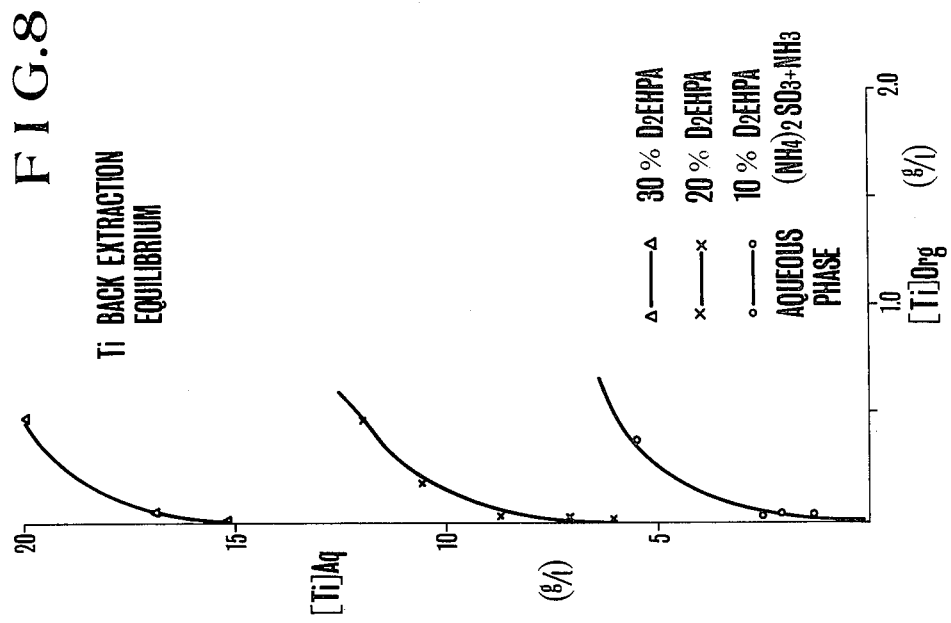
FIG. 8 Ti BACK EXTRACTION EQUILIBRIUM

TREATMENT OF RAW MATERIALS CONTAINING TITANIUM

BACKGROUND OF THE INVENTION

This invention is concerned with the production of titanium dioxide which is characterized by recovery of reusable $H_2SO_4$, high pure Fe oxide and hydroxide and fractional recovery of Mn, V and Cr, etc., from $FeSO_4 \cdot nH_2O$ and waste acid of 20 – 40% $H_2SO_4$ containing abundant heavy metallic ions, which are by-products of the production of $TiO_2$ by dissolution of Ti raw materials, such as, ilmenite, steel production slag, such as, electric furnace slag, convertor slag with $H_2SO_4$.

In the conventional production of $TiO_2$ using $H_2SO_4$, the required amount of 98% $H_2SO_4$ per 1 ton of $TiO_2$ product is 3.5 to 4.2 tons. Nevertheless, an economical treatment of $FeSO_4 \cdot nH_2O$ and waste acids produced in abundance as by-products after the separation of Ti compounds by the hydrolysis process has not been found and the practice of retaining or discarding them in the untreated form has given rise to serious pollution problems. This invention has been developed to overcome the faults of the conventional production process described above.

SUMMARY OF THE INVENTION

The present invention relates to the production of titanium dioxide which is characterized by the recovery of reusable $H_2SO_4$, high pure Fe oxide and hydroxide and fractional recovery of Mn, V and Cr, etc., from $FeSO_4 \cdot nH_2O$ and waste acid of 20 – 40% $H_2SO_4$ containing abundant heavy metallic ions, which are by-products in the production of $TiO_2$ by dissolution of Ti raw materials, such as, ilmenite, steel production slag, such as electric furnace slag, convertor slag, with $H_2SO_4$.

The summary of this invention is as follows. The present invention is firstly characterized by the absence of the production of waste acids and $FeSO_4 \cdot nH_2O$ is as follows: The aqueous solution pretreated after dissolution of the Ti raw materials with $H_2SO_4$ is brought into contact and mixed with an organic solvent (A) to extract metallic ions, such as, $Cr^{3+}$ and $Nb^{5+}$ ions in the first stage and the bulk of Ti ions in the resulting aqueous solution is separated by well-known hydrolysis process in the 2nd stage. The metallic ions, such as, Ti, Mn and V ions remaining in the resulting aqueous solution are extracted into an organic solvent (B) in the 3rd stage, an organic solvent (C) extracts Fe ions in the resulting aqueous solution after the oxidation of $Fe^{2+}$ ions to $Fe^{3+}$ ions in the 4th stage and $V^{5+}$ ions in the resulting aqueous solution are extracted into an organic solvent (D) in the 5th stage. The resulting aqueous solution from the 5th stage is the reusable regenerated acid for use in dissolution of raw materials.

The second characteristic of the present invention is concerned with the extraction of Fe ions from the aqueous solution using $Cl_2$ gas for the oxidation as follows: After the conversion of $Fe^{2+}$ ions in the aqueous solution from the 3rd stage as described hereinafter to $Fe^{3+}$ ions using $Cl_2$ gas, the amount of HCl required to extract $Fe^{3+}$ ions in the aqueous solution as the Fe chloride complex is added to the resulting aqueous solution and is contacted with an organic solvent (E) to extract Fe-Cl ions into the organic phase.

The third characteristic of this invention is concerned with the reduction of energy in the concentration process of the acid as follows. $FeSO_4 \cdot nH_2O$ which is a by-product in the pretreatment process is dissolved with water or acids from the fourth stage, the oxidation of $Fe^{2+}$ ions in the resulting aqueous solution to $Fe^{3+}$ ions is finished and then $Fe^{3+}$ ions in the resulting aqueous solution are extracted into the organic phase by contact of the organic solvent (C). The resulting increase in the concentration of regenerated acid by several repetitions of the above operation as necessary produces reduction in the energy required in the following concentration processes of the acid.

The fourth characteristic of the present invention is concerned with the treatment of $FeSO_4 \cdot nH_2O$ with the fractional extraction of Mn and Fe ions as follows. After dissolution of the $FeSO_4 \cdot nH_2O$ by-product with water, $Mn^{2+}$ ions in the resulting aqueous solution are extracted with an organic solvent (F) into the organic phase to separate them from the $Fe^{2+}$ ions in the resulting aqueous solution, the $Fe^{2+}$ ions are oxidized to $Fe^{3+}$ ions and then the $Fe^{3+}$ ions are extracted into the organic phase by contacting them with the organic solvent (C). The concentration of the recovered acid is enhanced by several repetitions of the above operation as necessary and by recycling for dissolution of the raw materials by way of the concentration process.

The fifth characteristic of this invention is concerned with the reduction of the recovery cost by increasing the Fe concentration in the aqueous solution which is introduced into the recovery process of HCl and Fe as follows. The Fe concentration of the aqueous solution introduced into the recovery process of HCl and Fe is increased by extracting $Fe^{3+}$ ions in the back-extraction solution of the organic solvent (C) with contact of the organic solvent (E) and stripping with water. The increased Fe concentration produces the reduction of recovery cost.

The 6th characteristic of this invention is concerned with the reasonable recovery of Fe compounds using both solvent extraction and diaphragm-electrolysis techniques as follows. The back-extraction solution of the organic solvent (C) or of the organic solvent (E) is introduced into the cathode compartment of the diaphragm-electrolysis, $Fe^{3+}$ ions are reduced to $Fe^{2+}$ ions there, free acid is transferred to the anode compartment and hydrated Fe oxide or hydroxide is recovered by the contact of air or oxygen with the aqueous solution in the cathode compartment containing a lesser amount of free recovered acid.

The 7th characteristic of this invention is concerned with the fractional recovery of metallic ions coextracted into the organic solvent (B) as follows. Mn, V and Fe ions coextracted into the organic solvent (B) are scrubbed with HCl or $H_2SO_4$, Ti ions in the organic solvent (B) is back-extracted into the aqueous solution with contact of $(NH_4)_2CO_3$ + $NH_3$ solution, and then the organic solvent converted from H type to $NH_3$ type in the above operation is again converted to H type with contact of $H_2SO_4$. When $Cr^{3+}$ ions are coextracted, those in the organic phase can be recovered into the aqueous solution with contact of HCl + $H_2O_2$ or HCl + NaCl solution. Thus, the individual metallic ion coextracted into the organic solvent (B) are fractionally recovered. When $Al^{3+}$ and $Mg^{2+}$ ions are accumulated in the recovered acid during recycle of the recovered acid, the enhancement of their ions concentration is depressed by taking one part of out the extraction system and the solution is taken out is recovered as $(NH_4)_2SO_4$ by neutralizing with $NH_3$.

Since the desired purpose can be accomplished by installation of the process based on this invention along with the conventional production process of $TiO_2$, the control of production line of $TiO_2$ and its quality are unchangeable and consequently the practical application of this invention is very easy and the economical recovery of valuable metals which could not be economically recovered hitherto becomes possible. Therefore, the present invention has a great deal of industrial values for the connected industrial fields.

DETAILED EXPLANATION OF THE INVENTION

The present invention will be explained in detail with reference to drawings.

FIG. 7 is a graph showing $Ti^{4+}$ ion extraction equilibrium curve in the third stage.

FIG. 8 is a graph showing $Ti^{4+}$ ion back-extraction equilibrium curve in the third stage.

The following explanation is based on the experiments carried out by the inventors. The typical chemical analysis of ilmenite used commonly as a raw material of $TiO_2$ is shown as follows.

| $TiO_2$ | FeO | $Fe_2O_3$ | $V_2O_5$ | MnO | $Cr_2O_3$ | MgO |
|---|---|---|---|---|---|---|
| 54.20 | 26.60 | 14.20 | 0.16 | 0.40 | 0.07 | 1.03 |
| 53.13 | 19.11 | 22.95 | 0.19 | 0.94 | 0.03 | 0.92 |
| | | | | | | Values in wt.% |

2 to 2.5 tons of raw material described above per 1 ton of $TiO_2$ product is sulfatized with 3.5 to 4 tons of 98% $H_2SO_4$. After heating to sulfatize, $Fe^{3+}$ ions in the resulting aqueous solution is completely reduced with Fe scrap. The clarified solution is produced by removing undissolved residues. The chemical composition of the aqueous solution which is obtained after removing one part of Fe ions as $FeSO_4 \cdot nH_2O$ crystal is shown as follows

| $TiO_2$ | $Fe^{2+}$ | $T \cdot H_2SO_4$ | $Cr^{3+}$ | $Mn^{2+}$ | $V^{4+}$ | $Mg^{2+}$ |
|---|---|---|---|---|---|---|
| 200 | 32 | 300 | 0.1 | 1.8 | 0.3 | 1.6 |
| | | | | | | Values in g/l |

The synthesized solution having the above mentioned chemical composition and no $Fe^{3+}$ ions was as a standard solution in the following experiment.

(1) The First Stage

The extraction of $Cr^{3+}$ and $Nb^{5+}$ ions with the organic solvent (A) is run before hydrolysis process owing to their superior extractability in lower concentrations of free acid and higher temperatures of the aqueous solution. Organic solvent (A) is made up of primary, amine secondary, tertiary or quaternary amines, for example, "Primene JMT" (tradename, primary amine produced by Rohm and Haas), "Amberlite LA-1" (tradename, secondary amine produced by Rohm and Haas), "Alamine 336" (tradename, tertiary amine produced by General Mills), and "Aliquat 336" (tradename, quaternary amine produced by General Mills), 2 – 5% higher alcohols such as, octanol, dodecanol or isodecanol as a modifier and aromatic aliphatic or paraffin hydrocarbon as a diluent. The organic solvents used in this experiment indicate only one example and of course similar organic solvents can be utilized.

- Extraction -

The extraction test is done with the increased concentration of $Cr^{3+}$ and $Nb^{5+}$ ions by adding and adjusting the $Cr_2(SO_4)_3$ and $NbCl_5$ concentration in the aqueous solution described above. $Cr^{3+}$ and $Nb^{5+}$ ions are extracted according to the following formulas.

Figure 3:
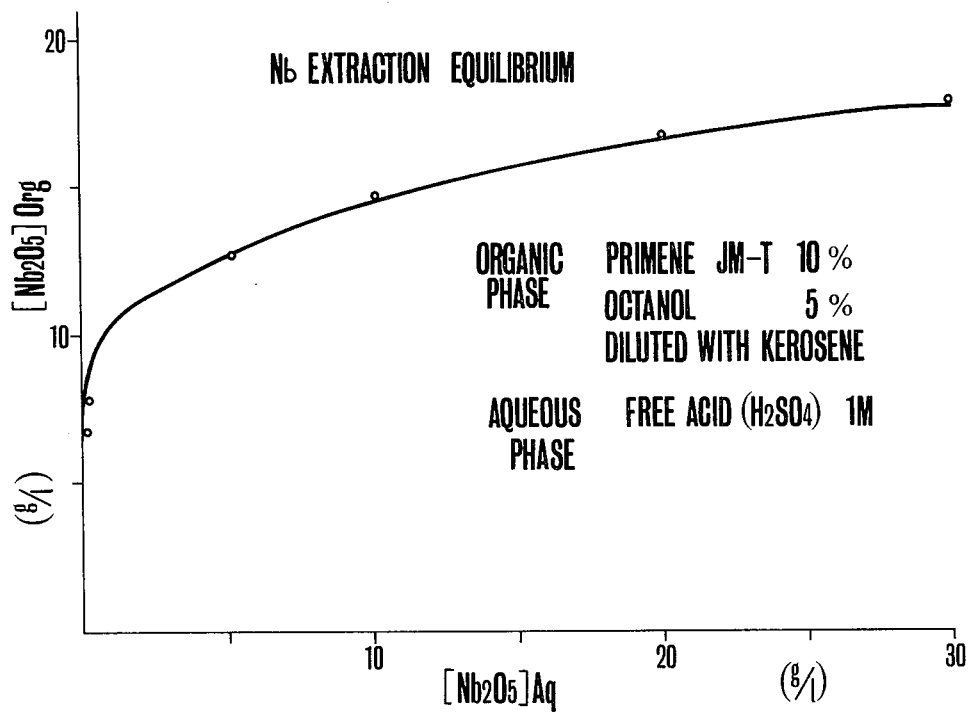
FIG. 3 is a graph showing Nb extraction equilibrium curve with amine in the first stage.
Figure 4:
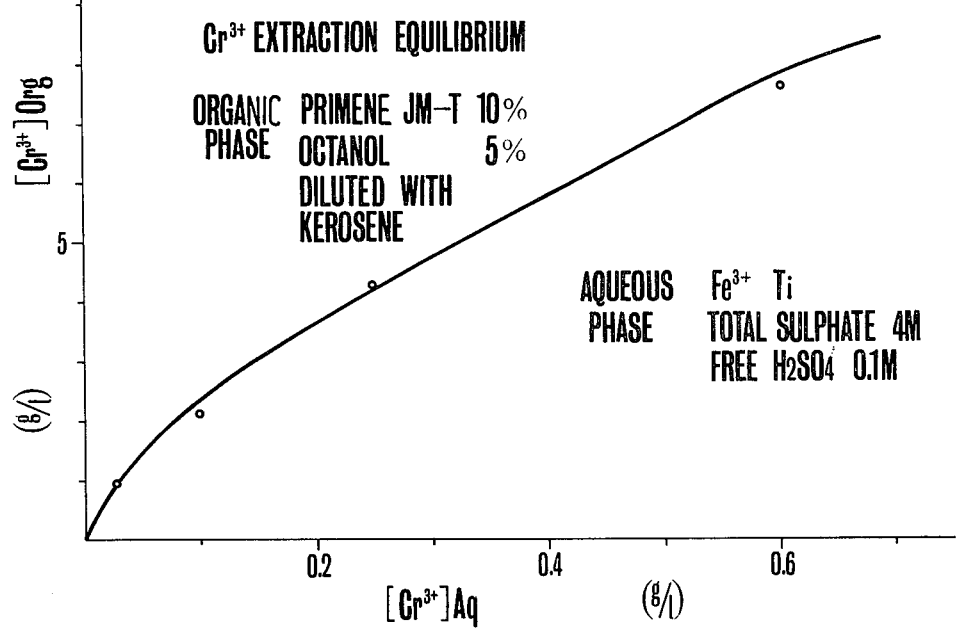
FIG. 4 is a graph showing $Cr^{3+}$ ion extraction equilibrium curve with amine in the first stage.

| $NbO(SO_4)_2^-$ (Aq) | + | $H_2RN$ (Org) | + | $H^+$ (Aq) | $\rightleftarrows$ | $(H_2RNH^+) \cdot NbO(SO_4)_2^-$ (Org) | (see FIG. 3) |
| $CrSO_4$ (Aq) | + | $H_2RN$ (Org) | + | $H^+$ (Aq) | $\rightleftarrows$ | $(H_2RNH^+) \cdot CrSO_4^-$ (Org) | (see FIG. 4) |

The extractability of $Cr^{3+}$ ions by amines follows the order: primary amine > secondary amine > tertiary amine. However, there is little difference in the extractability of $Nb^{5+}$ ions with various amines. The main factors of the $Cr^{3+}$ ions extraction are temperature, contact time and concentration of free acid. The high extractability of $Cr^{3+}$ ions is obtained the 50° to 80° C and the longer contact time the higher the concentration of free acid.

- Stripping -

$Cr^{3+}$ ions extracted into the organic solvent (A) are stripped from the organic phase with by contact with HCl or $H_2SO_4$ according to the under formula.

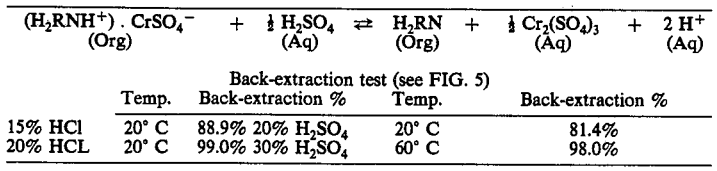

Figure 5:
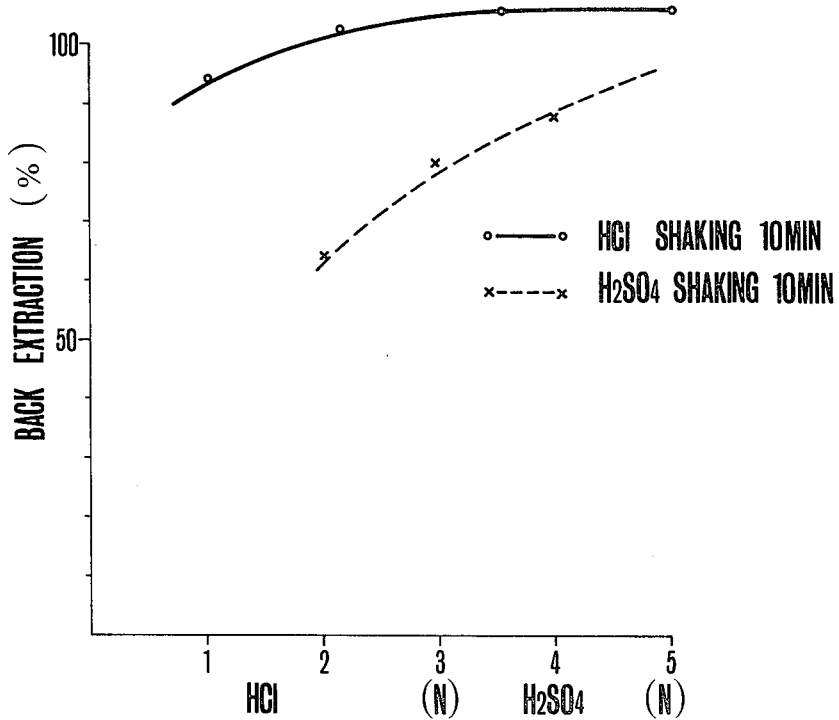
FIG. 5 is a graph showing $Cr^{3+}$ ion back-extraction equilibrium curve with HCl or $H_2SO_4$ in the first stage.

|  | Temp. | Back-extraction test (see FIG. 5) Back-extraction % | Temp. | Back-extraction % |
|---|---|---|---|---|
| 15% HCl | 20° C | 88.9% 20% $H_2SO_4$ | 20° C | 81.4% |
| 20% HCL | 20° C | 99.0% 30% $H_2SO_4$ | 60° C | 98.0% |

After removing $Cr^{3+}$ ions from the organic solvent (A), $Nb^{5+}$ ions is stripped from the organic phase with contact of $NH_4F + NH_3$ solution according to the following formula.

$$(H_2RNH^+) \cdot NbO(SO_4)_2^- + NH_4F + 4NH_4OH \rightleftharpoons H_2RN + Nb(OH)_5 + 2(NH_4)_2SO_4 + NH_4F$$
$$\text{(Org)} \qquad\qquad \text{(Aq)} \qquad \text{(Aq)} \qquad\qquad \text{(Org)} \quad \text{(ppt)} \qquad \text{(Aq)} \qquad\qquad \text{(Aq)}$$

(2) The Second Stage

A large amount of Ti ions is removed as Ti hydroxide by hydrolysis process of the resulting aqueous solution from which $Cr^{3+}$ and $Nb^{5+}$ ions have been extracted. The approximate chemical composition of the liquor after separation of titanium is shown as follows.

| $TiO_2$ | $Fe^{2+}$ | T.$H_2SO_4$ | $Cr^{3+}$ | $V^{4+}$ | $Mn^{2+}$ | $Mg^{2+}$ |
|---|---|---|---|---|---|---|
| 7 | 32 | 300 | Tr | 0.3 | 2.8 | 1.6 |

Values in g/l

(3) The Third Stage

Figure 6:
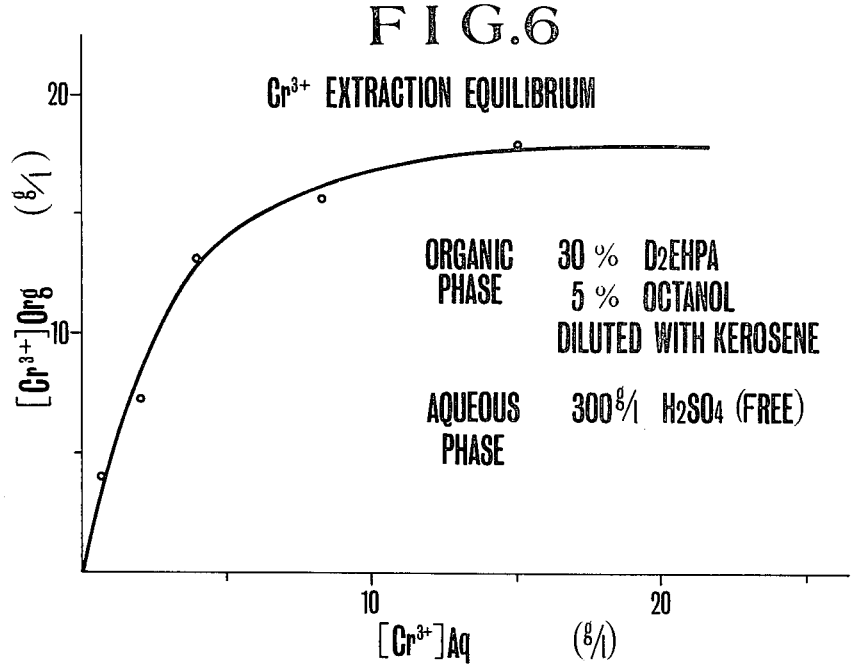
FIG. 6 is a graph showing $Cr^{3+}$ ion extraction equilibrium curve from sulfate solution in the third stage.

Ti ions and one part of the $V^{4+}$ ions in the resulting aqueous solution are extracted into the organic phase with the organic solvent (B). When there are $Cr^{3+}$ ions from the omission of the first stage, $Cr^{3+}$ ions are coextracted with Ti ions into the organic solvent (B) as shown in FIG. 6. The organic solvent (B) is composed of alkyl phosphoric acid, for example, D2EHPA(Di-2-ethyl hexyl phosphoric acid) and $H_2DDP$ (Mono-dodecyl phosphoric acid), 2 - 5% higher alcohols, such as, octanol, decanol or isodecanol as a modifier and aromatic, aliphatic or paraffin hydrocarbons as a diluent.

- Extraction -

$Ti^{4+}$ ions are extracted with the organic solvent (B) according to the under formula.

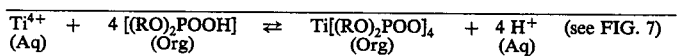

The resulting solution includes a small amount of $V^{5+}$ ions and they are slightly extracted. While, $Fe^{3+}$ ions are not commonly contained in the resulting solution, but if $Fe^{3+}$ ions exist in it, they are completely extracted like $Ti^{4+}$ ions. $Mn^{2+}$ ions are extracted as the concentration of free acid lowers.

- Continuous extraction test -

The liquor as shown in the following table was continuously treated with the organic solvent (B) at a flow rate of 0.15 l/min. using a mixer-settler (100 mm W × 500 mm L × 180 mm H). The mixer was of the pump-suction type and rotated at 120 - 310 r.p.m. depending on the interface level in the settler using a non-stepwise speed changer. The organic solvent used consists of 20% D2EHPA, 3% octanol and kerosene in balance.

| | | The third stage - Extraction | | | | | | |
|---|---|---|---|---|---|---|---|---|
| Apparatus | Flow ratio O/A | Inlet(Aq) | | | | Outlet(Aq) | | |
| | | Ti | V | Fe | $H_2SO_4$ | Ti | V | Fe | $H_2SO_4$ |
| 5 Stage mixer-settler | 1.0/ 1.0 | 7.1 | 0.2 | 31.8 | 300 | tr | 0.18 | 31.8 | 300 |

| Outlet (Org) | | | | Solvent |
|---|---|---|---|---|
| Ti | V | Fe | $H_2SO_4$ | 20%D2EHPA |
| 7.1 | 0.02 | <0.01 | <0.1 | 3% octanol diluted with kerosene |

Values in g/l

- Scrubbing -

$V^{4+}$, $Fe^{3+}$ and $Mn^{2+}$ ions, which are extracted in the low concentration of free acid, coextracted with $Ti^{4+}$ ions into the organic solvent (B) are scrubbed from the organic solvent (B) by contact with of HCl, $H_2SO_4$ or $HNO_3$, but $Ti^{4+}$ and $Cr^{3+}$ ions are not scrubbed.

| | | Scrubbing test with 15% HCl | | | |
|---|---|---|---|---|---|
| Metallic ions concentration in the org. phase | | Flow ratio O/A | Temp. | shaking time | Back-extraction % |
| $Mn^{2+}$ | 0.2 g/l | 1.0 | Room temp. | 15 min. | 99.5% |
| $V^{4+}$ | 0.5 g/l | 1.0 | " | " | 99.0% |
| $Fe^{3+}$ | 1.0 g/l | " | " | " | 98.5% |
| $Cr^{3+}$ | 0.5 g/l | " | 60° C | 30 min. | 0% |
| $Ti^{4+}$ | 7.0 g/l | " | Room temp. | " | 0% |

The organic solvent (B) extracted Ti ions are scrubbed by contact of HCl, $H_2SO_4$ or $HNO_3$ to remove $V^{4+}$ and $Mn^{2+}$ ions, etc. coextracted with $Ti^{4+}$ ions into the organic solvent (B). The selection of HCl, $H_2SO_4$ or $HNO_3$ as a scrub solution is done after consideration of the finished recovery form of scrubbed V and Mn, etc. The organic solvent (B) after the scrubbing process includes only $Ti^{4+}$ ions, but includes also $Cr^{3+}$ ions provided that the first stage is omitted.

- Continuous scrubbing test -

The apparatus for the test is the same one used for the extraction process and the flow rates of organic aqueous phases are 0.5 l/min. and 0.05 l/min., respectively.

| | | The third stage - Scrubbing | | | | | |
|---|---|---|---|---|---|---|---|
| Apparatus | Flow ratio O/A | Inlet (Org) | | Outlet (Org) | | Outlet (Aq) | | Note |
| | | Ti | V | Ti | V | Ti | V | |
| 5 Stage mixer- | 10/1 | 7.10 | 0.02 | 7.10 | 0.01 | — | 0.2 | Temp.: 35° C Scrub sol. |

-continued

| Apparatus | Flow ratio O/A | The third stage - Scrubbing | | | | | Note |
|---|---|---|---|---|---|---|---|
| | | Inlet (Org) | | Outlet (Org) | | Outlet (Aq) | |
| | | Ti | V | Ti | V | Ti | V | |
| settler | | | | | | | | : 15% HCl |

Values in g/l

- Stripping -

$Ti^{4+}$ ions in the organic solvent (B) after the scrubbing process are stripped in the following stripping process.

Back-extraction test of Ti ions with various back-extraction solutions

Flow ratio : O/A = 1/1, Shaking time: 15 min. Temp.: Room temp.

| | Back-extraction % | | Back-extraction % |
|---|---|---|---|
| 6N $H_2SO_4$ | 0 | 0.5 N HF | 64.71 |
| 12N $H_2SO_4$ | 0 | 0.5N $NH_4F$ | 75.03 |
| 6N HCl | 0 | 6N $H_2SO_4$ +1% $H_2O_2$ | 36.04 |
| 12N HCl | 0 | $(NH_4)_2SO_4$ | 0 |
| 4N $HNO_3$ | 0 | $(NH_4)_2SO_4$ + $NH_3$ | 98.0 |
| 8N $HNO_3$ | 0.4 | Saturated $(NH_4)_2CO_3$ | 99.5 |
| 11N $H_3PO_4$ | 5.7 | 1M $(NH_4)_2CO_3$ + $NH_3$ | 99.5 |

It is considered from the result of the back-extraction test that 0.5 M - saturated $(NH_4)_2CO_3$ + $NH_3$ solutions with pH values maintained between 7 and 9.5 and over 2 M$(NH_4)_2SO_4$ + $NH_3$ solutions with pH values maintained over 7.0 are the most suitable back-extraction solutions of Ti ions from the standpoint of cost and subsequent operations. Therefore, the mechanism of the back-extraction of Ti ions is shown as follows.

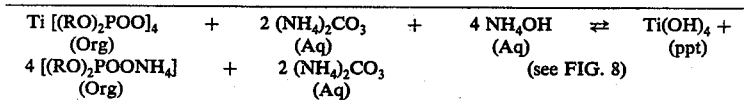

As shown in the above formula, $(NH_4)_2CO_3$ used for the back-extraction forms $HCO_3^-$ ion in the back-extraction of Ti and $HCO_3^-$ ion formed reacts with $NH_3$ to form $(NH_4)_2CO_3$ again.

| Apparatus | Flow ratio O/A | The third stage - Stripping | | | Note |
|---|---|---|---|---|---|
| | | Inlet (Org Ti | Outlet (Org) Ti | Outlet (Aq) Ti | |
| 5 Stage-mixer-settler | 1/1 | 7.10 | 0.01 | 7.10* | 1M$(NH_4)_2CO_3$ + $NH_3$ pH: 9.5 Temp.: 23° C |

Remark : The value of Ti* in the back-extraction solution is one obtained the remelting the precipitate as $Ti(OH)_4$.

Figure 9:
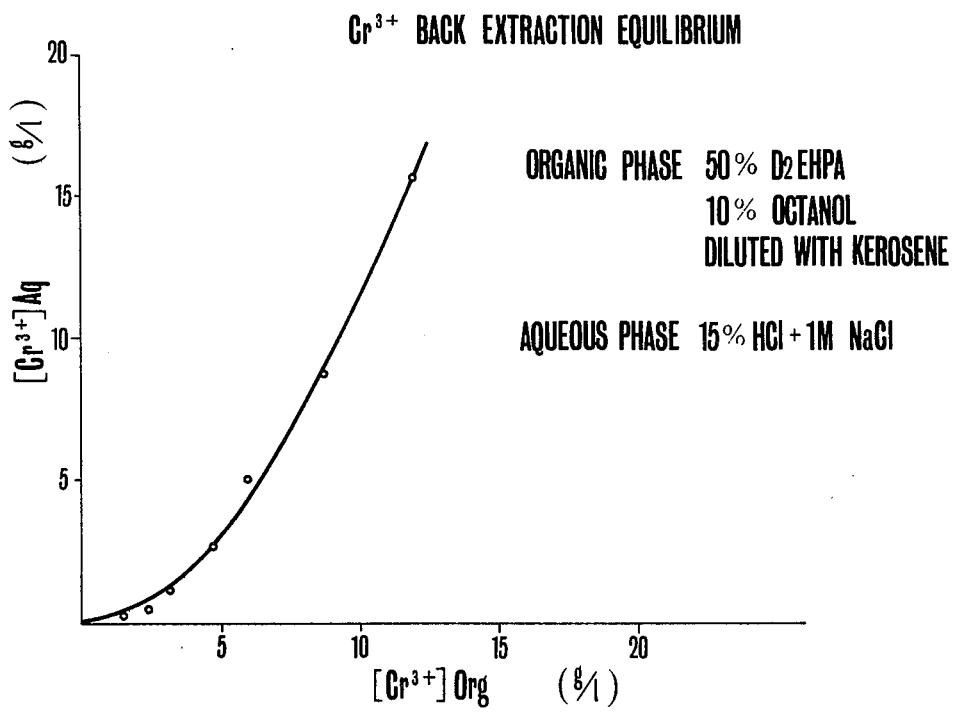
FIG. 9 is a graph showing $Cr^{3+}$ ion back-extraction equilibrium curve in the third stage.

As the organic solvent (B) becomes the $NH_4$ type by stripping Ti ions, it is converted to the H type by with contact of $H_2SO_4$ or HCl in the following process. When $Cr^{3+}$ ions are coextracted, $Cr^{3+}$ ions are stripped by contact with of $H_2SO_4$ + $H_2O_2$, HCl + $H_2O_2$ or HCl + NaCl solution and then the $NH_4$ type of the organic solvent (B) is converted to the H type. (see FIG. 9).

(4) The Fourth Stage

- Extraction -

$Fe^{2+}$ ions in the resulting solution in which Ti ions are separated are converted to $Fe^{3+}$ ions with $H_2O_2$, oxygen, high pressure air or electro-oxidation and $Fe^{3+}$ ions in the resulting aqueous solution are extracted into the organic phase with the organic solvent (C). The organic solvent (C) is composed of alkyl phosphoric acid, for example, D2EHPA, mixed solvent of alkyl phosphoric acid and LIX-63 (tradename, chelate reagent produced by General Mills) or α-bromo lauric acid, 2 - 5% higher alcohol as a modifier and aromatic, aliphatic or paraffin hydrocarbon as a diluent.

Figure 10:
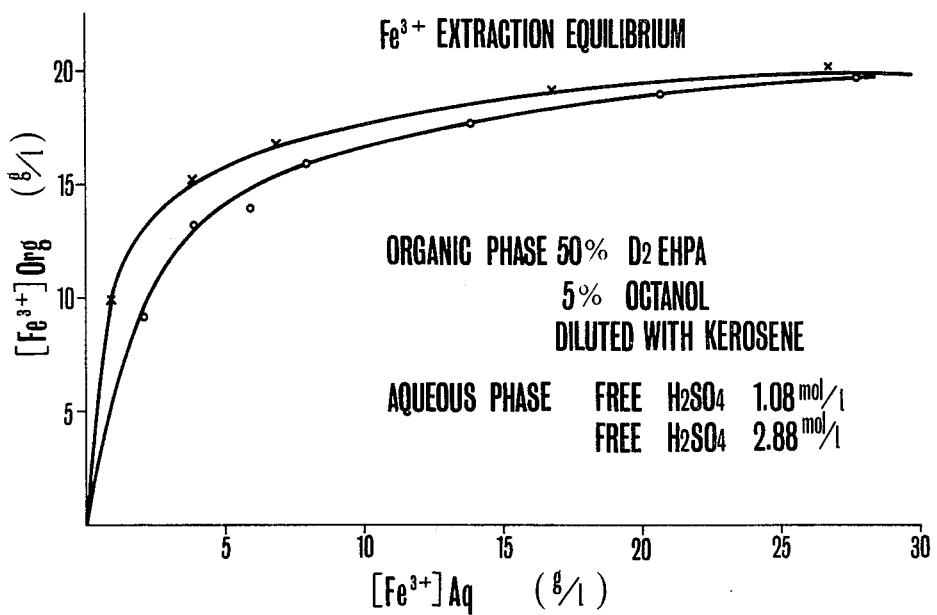
FIG. 10 is a graph showing $Fe^{3+}$ ion extraction equilibrium curve with D2EHPA in the fourth stage.
Figure 11:
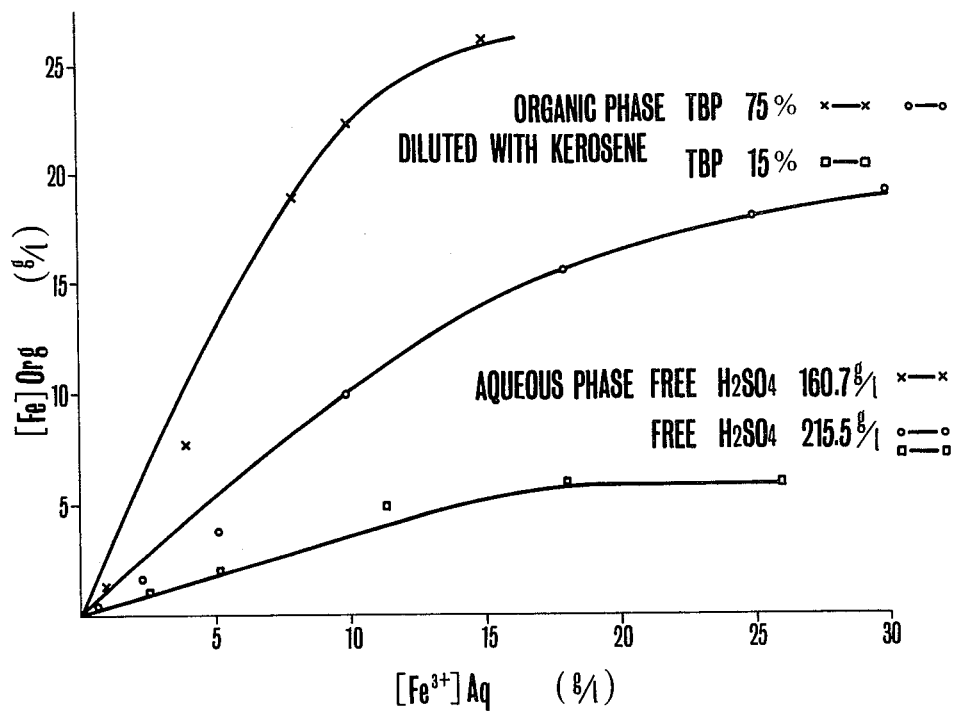
FIG. 11 is a graph showing $HFeCl_4$ extraction equilibrium curve with TBP in the fourth stage.
Figure 12:
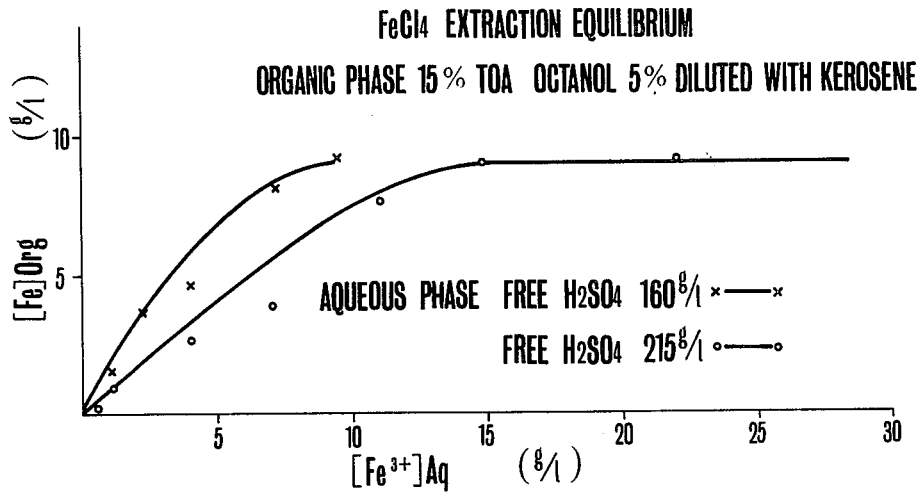
FIG. 12 is a graph showing $FeCl_4^-$ extraction equilibrium curve with amine in the fourth stage.

The extraction mechanism of $Fe^{3+}$ ion with alkyl phosphoric acid is shown as follows. (See FIG. 10)

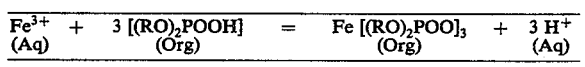

While, $Fe^{2+}$ ions are oxidized to $Fe^{3+}$ ions using $Cl_2$ gas and Fe ions are extracted into the organic phase with the organic solvent (E) after adding HCl to the resulting aqueous solution in an amount enough to extract the $Fe^{3+}$ ions as an Fe chloride complex. The organic solvent (E) is made up of phosphoric acid ester, for example, TBP (tri-butyl phosphoric acid), TOP (tri-octyl phosphoric acid), DBBP (di-butyl butyl phosphonate) or TOPO (tri-octyl phosphine oxide) and aromatic, aliphatic or paraffin hydrocarbons as a diluent.

Moreover, the organic solvent (E) may be made up of primary, secondary, tertiary or quaternary amine, higher alcohol as a modifier and aromatic, aliphatic, or paraffin hydrocarbons as a diluent. The test used Primene-JMT as a primary amine, LA-1 as a secondary amine, Alamine 336 as a tertiary amine and Aliquat 336 as a quaternary amine. Of course, similar amines can be utilized besides the amines described above. Furthermore, mixed solvent of phosphoric acid ester, such as, TBP and tertiary amine such as TOA (tri-octyl amine) can be used. Fe ions are extracted into the organic phase with phosphoric acid ester or amine according to the following formulas.

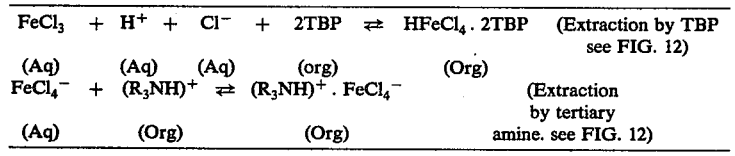

- Stripping -

$Fe^{3+}$ ions extracted into the organic phase with the organic solvent (C) are stripped from the organic phase with HCl and the organic solvent (C) is regenerated as shown in the following formula.

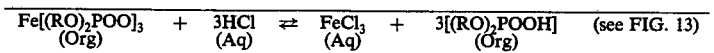

Figure 13:
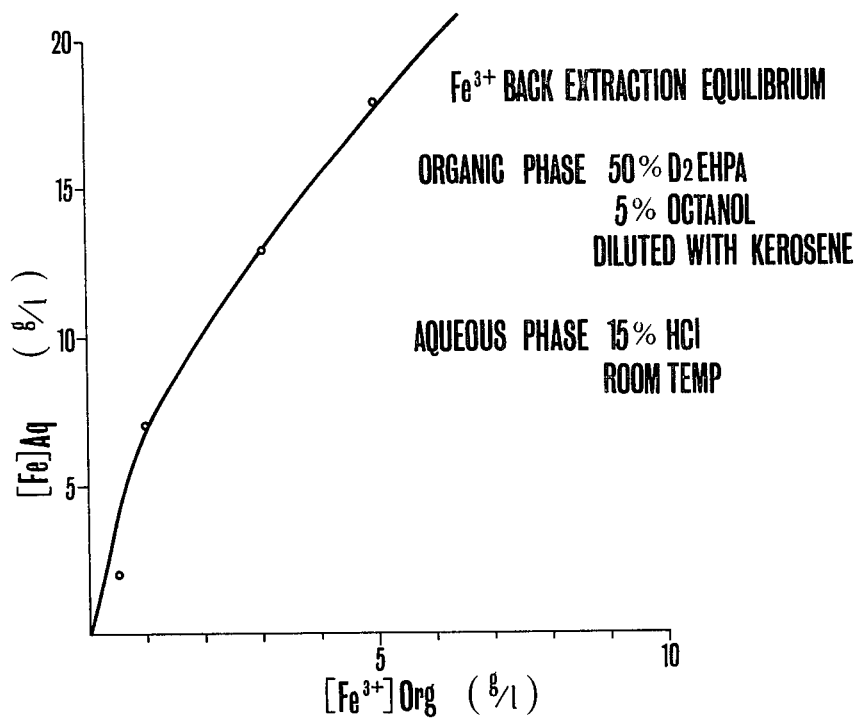
FIG. 13 is a graph showing $Fe^{3+}$ ion back-extraction equilibrium curve in the fourth stage.

(see FIG. 13)

Figure 14:
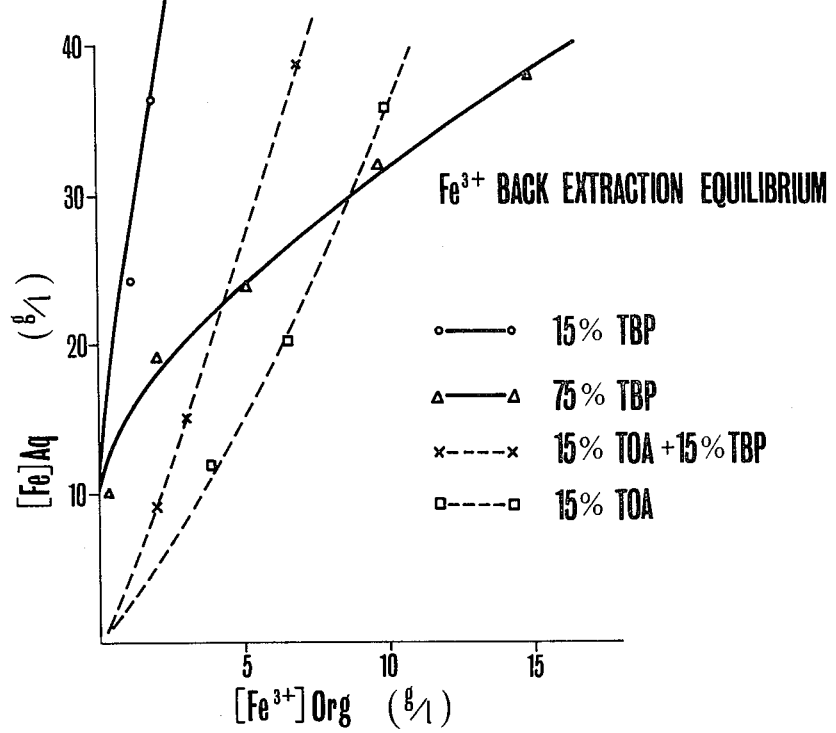
FIG. 14 is a graph showing $HFeCl_4$ and $FeCl_4^-$ back-extraction equilibrium curve in the fourth stage.

While, Fe chloride complex extracted into the organic phase with the organic solvent (E) is stripped from the organic phase with water and the organic solvent (E) is regenerated according to the following formulas (see FIG. 14).

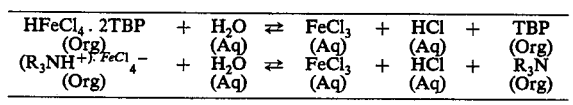

- Continuous extraction and stripping test -

The apparatus used for the test is the same one used in the first stage. The flow rate of organic and aqueous phases were 0.1 l/min.

| Apparatus | Flow ratio O/A | Extraction Inlet(Aq) Fe | $H_2SO_4$ | Outlet(Aq) Fe | $H_2SO_4$ | Outlet(Org) Fe | $H_2SO_4$ | Note |
|---|---|---|---|---|---|---|---|---|
| 10 Stage mixer-settler | 3/1 | 31.8 | 300 | <0.01 | 300 | 10.6 | <0.01 | 30% D2EHPA 3% decanol kerosene |
| 15 Stage mixer-settler | 4/1 | 31.8 | 300 | <0.01 | 300 | 7.94 | <0.01 | 15% TBP kerosene | values in g/l

| Apparatus | Flow ratio O/A | Stripping Inlet(Org) Fe | HCl | Outlet(Org) Fe | HCl | Outlet(Aq) Fe | HCl | Note |
|---|---|---|---|---|---|---|---|---|
| 10 Stage mixer settler | 1.5/1.0 | 10.6 | — | 0.1 | — | 15.9 | 150 | Room temp. 150 g/l HCl |
| " | 10/1 | 7.94 | 20.5 | 0.6 | 1.5 | 73.4 | 189 | 60° C $H_2O$ |

Values in g/l

(5) The Fifth Stage

- Extraction -

The resulting aqueous solution extracted off $Fe^{3+}$ ions contains a small amount of $Al^{3+}$, $Mg^{2+}$, $Mn^{2+}$ and $V^{4+}$ ions and is reused for dissolution of Ti raw materials through the concentration process. However, since these metallic ions are gradually accumulated in the recycling process, it is necessary to take them out the system and to prevent their accumulation. When acid is taken out the system or is recycled to reuse, it is connected with the improved economization of the apparatus to extract and recover the $V^{4+}$ ions which have an economical value among them.

Figure 15:
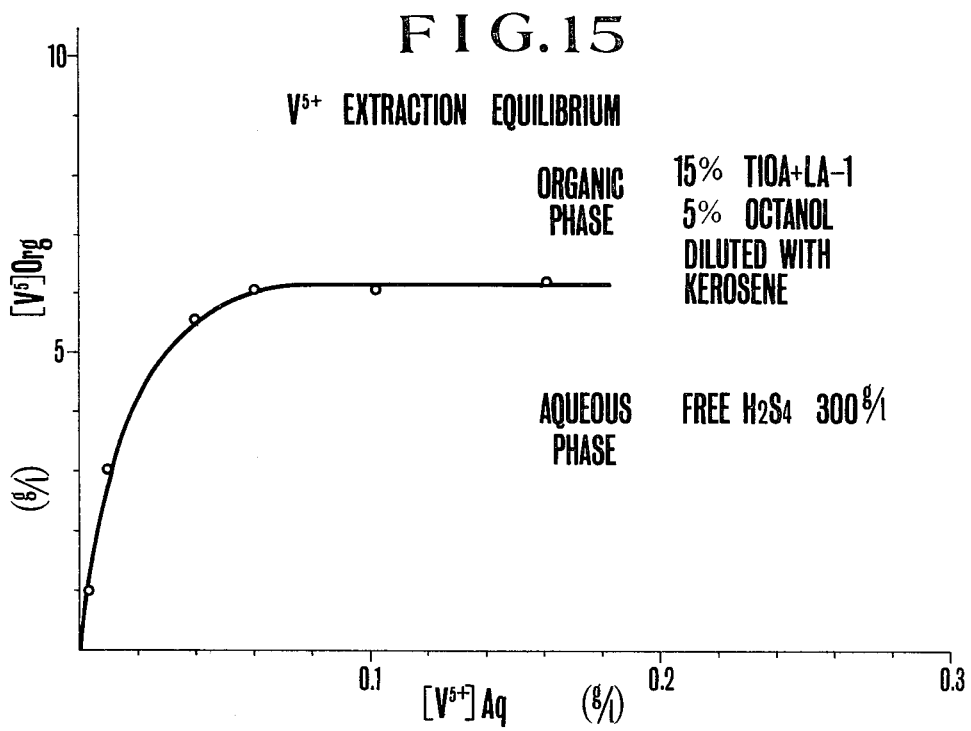
FIG. 15 is a graph showing $V^{5+}$ ion extraction equilibrium curve in the fifth stage.
Figure 16:
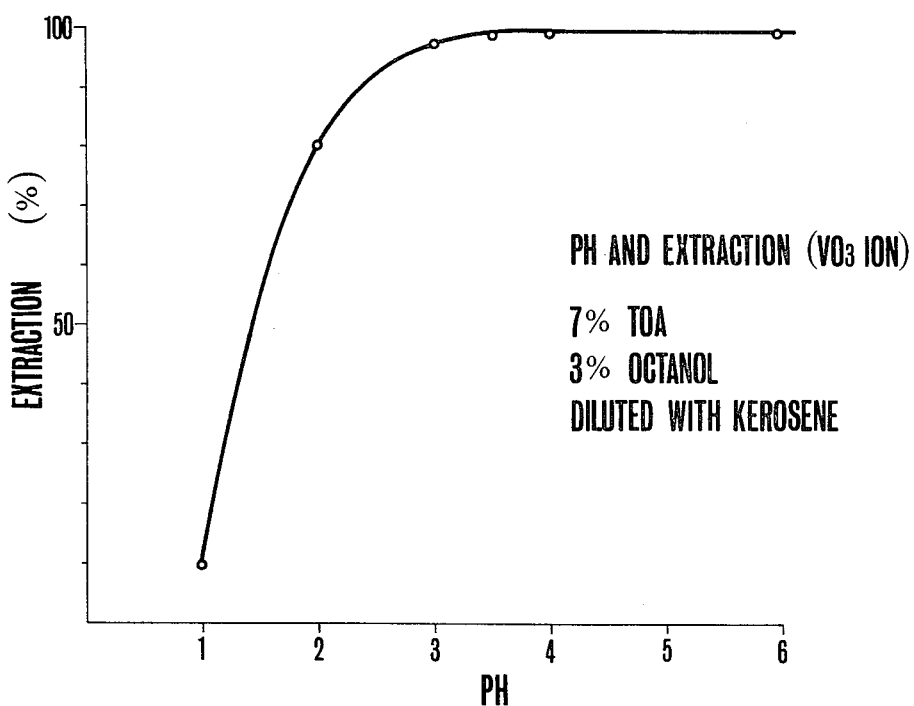
FIG. 16 is a graph showing the relation between $V^{5+}$ ion extraction and pH.

In the case of recycling for reuse, $VO(SO_4)_2^-$ ions in the resulting aqueous solution which has no Fe ions and 300 – 500 g/l of free acid are extracted into the organic phase by contact of the organic solvent (D). (see FIG. 15). In the other case of taking acid out the system, $VO_3^-$ ions in the aqueous solution, whose pH values are maintained between 2 and 4 with $NH_3$, are extracted into the organic phase with contact of the organic solvent (D). FIG. 16 shows the relation between the pH and V extraction coefficient.

The organic solvent (D) is made up of primary, secondary, tertiary or quaternary amine, 2 – 5% higher alcohols such as, octanol, decanol or isodecanol as a modifier and aromatic, aliphatic or paraffin hydrocarbons as a diluent. The amines used for the test are Primene-JMT as a primary amine, LA-1 as a secondary amine, Alamine 381 (tri isooctylamine produced by Ashland Chemical Co.) as a tertiary amine and Aliquat 336 as a quaternary amine. Of course, various similar amines can be commonly utilized besides the amines mentioned above.

- Stripping -

Figure 17:
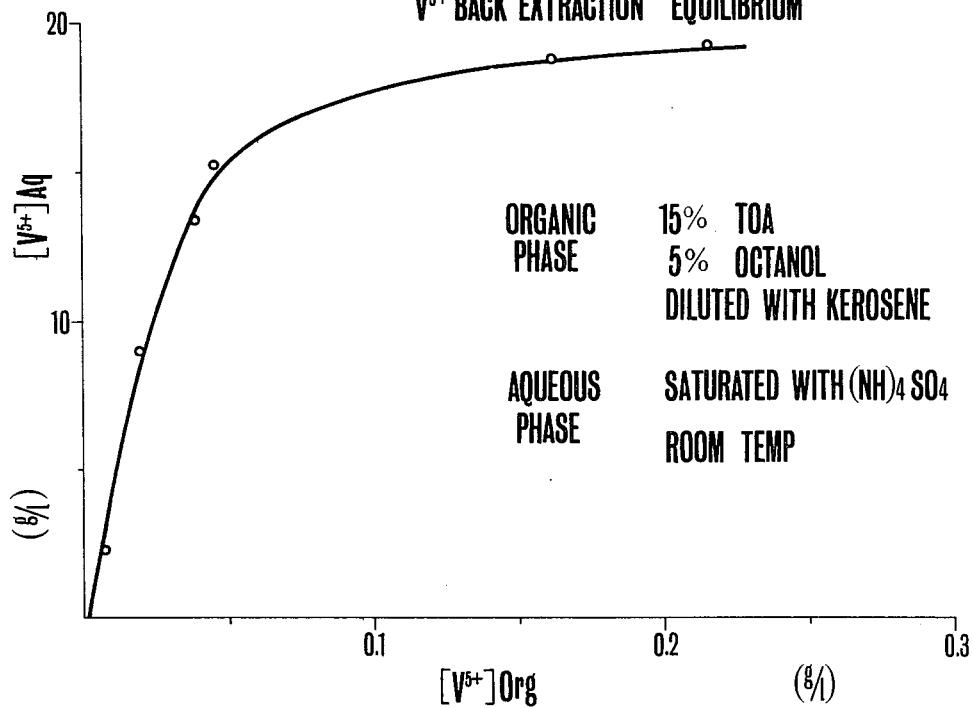
FIG. 17 is a graph showing $V^{5+}$ ion back-extraction equilibrium curve in the fifth stage.

$VO(SO_4)_2^-$ ions extracted into the organic solvent (D) are stripped from the organic phase with the contact of $(NH_4)_2SO_4$. While, $VO_3^-$ ions extracted into the organic solvent (D) can be stripped with $NH_4Cl + NH_3$ (see FIG. 17). Both types of V ions are recovered as the form of $NH_4VO_3$.

(6) The Treatment of By-product $FeSO_4.nH_2O$

Figure 18:
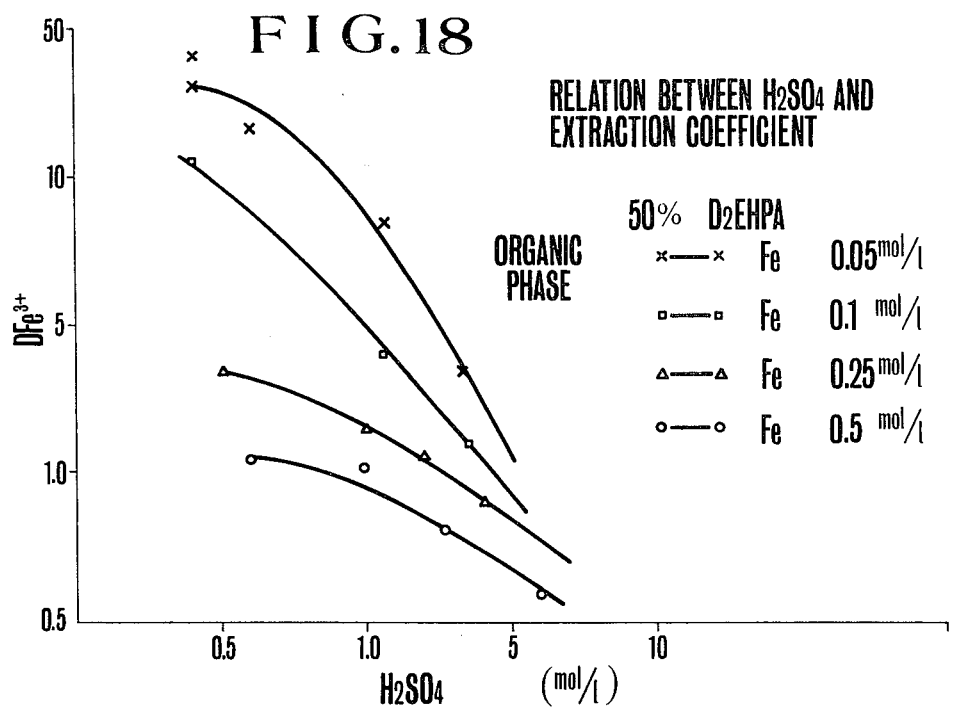
FIG. 18 is a graph showing the relation between $H_2SO_4$ concentration and $Fe^{3+}$ ion extraction coefficient.

The $H_2SO_4$ concentration produced after the extraction of $Fe^{3+}$ ions and almost all heavy metallic ions in the fourth stage is 250 – 300 g/l and consequently this low concentration of $H_2SO_4$ enhances the energy cost of the concentration to reuse for the dissolution of raw materials, through the concentration process. The $H_2SO_4$ concentration is increased by dissolving $FeSO_4.nH_2O$ by-produced in the pretreatment process into the aqueous solution from which the $Fe^{3+}$ ions are removed in order to reduce this energy cost. The several repetitions of the above operation in accordance with the demand can diminish the energy cost of concentration. The relation between the $H_2SO_4$ concentration and the $Fe^{3+}$ ions extraction coefficient is shown in FIG. 18.

Figure 1:
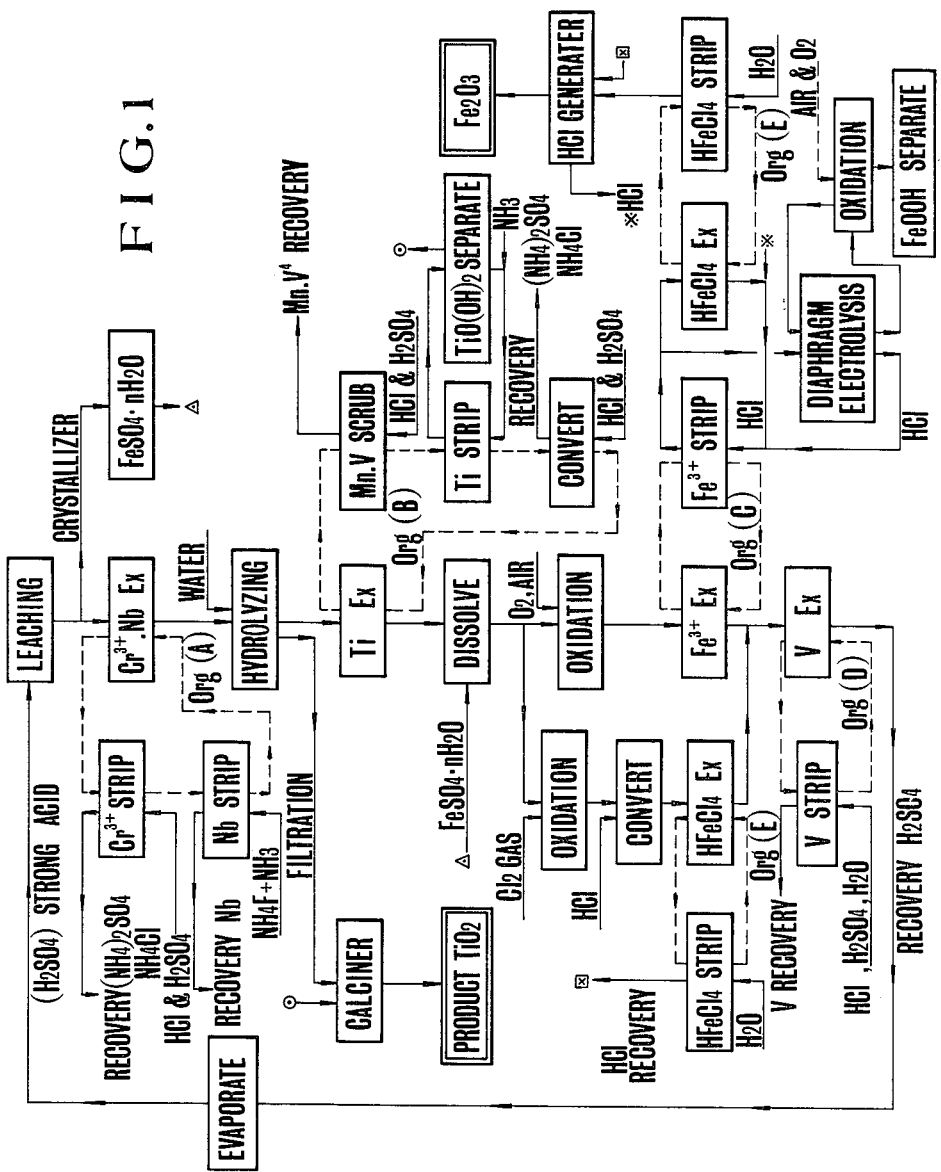
FIG. 1 and FIG. 2 show a general flow-sheet of the present invention.
Figure 2:
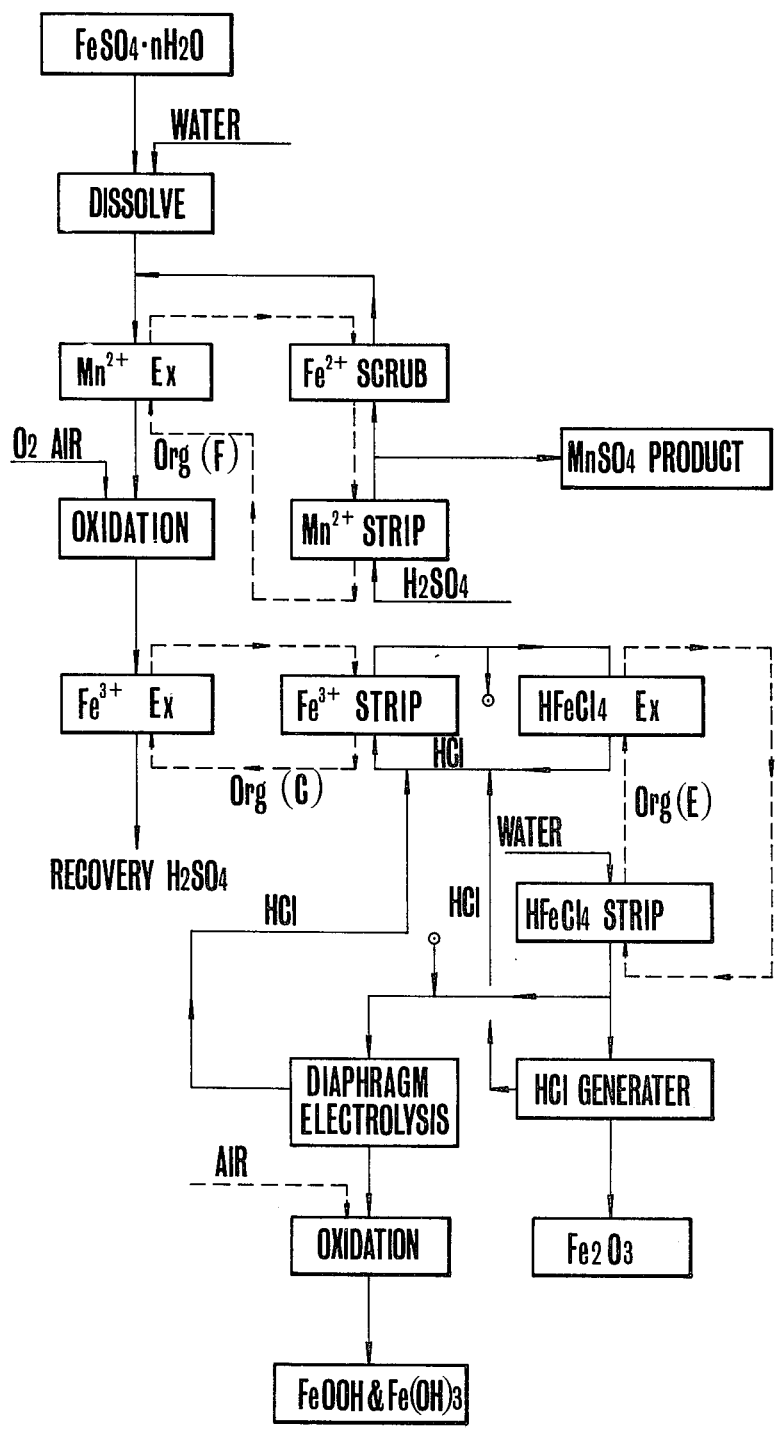
Figure 19:
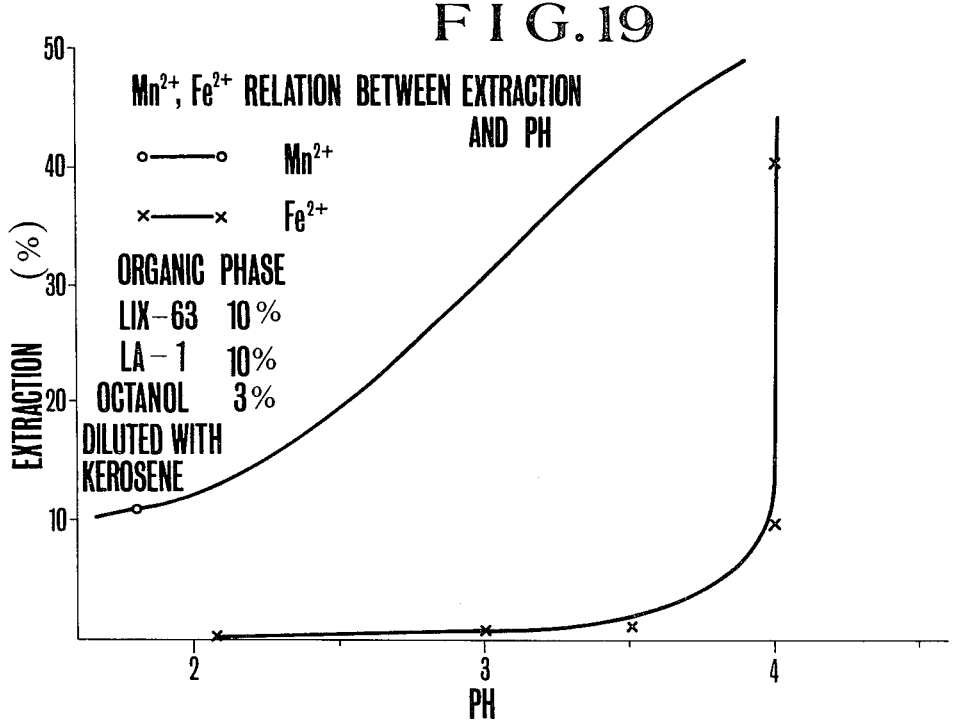
FIG. 19 is a graph showing the relation between $Mn^{2+}$ and $Fe^{2+}$ ions extraction coefficient and pH.

$FeSO_4.nH_2O$ often includes $MnSO_4$. As shown in the flow-sheet of FIG. 2, $Mn^{2+}$ ions are separated from $Fe^{2+}$ ions by extracting $Mn^{2+}$ ions by contact of the organic solvent (F) in the lower concentration of free acid produced by the dissolution of the $FeSO_4.nH_2O$ crystals with water (see FIG. 19).

The organic solvent (F) is composed of alkyl phosphoric acid, for example, D2EHPA, $H_2DDP$, 2 – 5% higher alcohol as a modifier and aromatic, aliphatic or paraffin hydrocarbons as a diluent. While, the organic solvent (F) may be made up of mixed solvent of D2EHPA and LIX-63 or primary, secondary, tertiary or quaternary amine. As described above, the mixed solvents consisted of mainly alkyl phosphoric acid and 5

- 20% of LIX-63, aliphatic hydroxy oxime or α-bromo lauric acid are used to extract Mn ions.

A small amount of $Fe^{2+}$ ions coextracted with $Mn^{2+}$ ions are scrubbed from the organic solvent (F) with contact of $MnSO_4$ solution having 2 - 3.5 of pH values, the organic solvent (F) contains only Mn ions and consequently $Mn^{2+}$ ions are stripped from the organic solvent (F) with 300 g of $H_2SO_4$ in the following process.

- Continuous extraction test -

The continuous extraction test using the under-tabulated $FeSO_4.nH_2O$ by-produced by the $H_2SO_4$ process was done and $MnSO_4$ was added to the resulting solution in order to facilitate the confirmation of the Mn extraction.

| Chemical analysis of $FeSO_4 . nH_2O$ | | |
|---|---|---|
| FeO | $TiO_2$ | MnO |
| 24.96% | 0.22% | 0.06% |

The pH value in dissolving 250 g of the above crystal with 1 liter of water was 1.8 and the chemical composition of the resulting solution to which Mn was added was shown as follows.

| | Total $H_2SO_4$ | Fe | Mn | Ti | (Values in g/l) |
|---|---|---|---|---|---|
| | 90.7 | 48.8 | 2.0 | 0.3 | |

| | Flow ratio | Extraction | | | | | | | | | |
|---|---|---|---|---|---|---|---|---|---|---|---|
| | | Inlet(Aq) | | | Outlet(Aq) | | | Outlet(Org) | | | |
| Apparatus | O/A | Fe | Mn | Ti | Fe | Mn | Ti | Fe | Mn | Ti | Note |
| 10 Stage mixer-settler | 4/1 | 48.8 | 2.0 | 0.3 | 48.4 | 0.1 | Tr | 0.1 | 0.49 | 0.1 | 20% D2EHPA |
| " | 2/1 | 48.8 | 2.0 | 0.3 | 48.6 | 0.1 | Tr | Tr | 1.0 | 0.15 | 10% LIX 63+10% D2EHPA |

Figure 20:
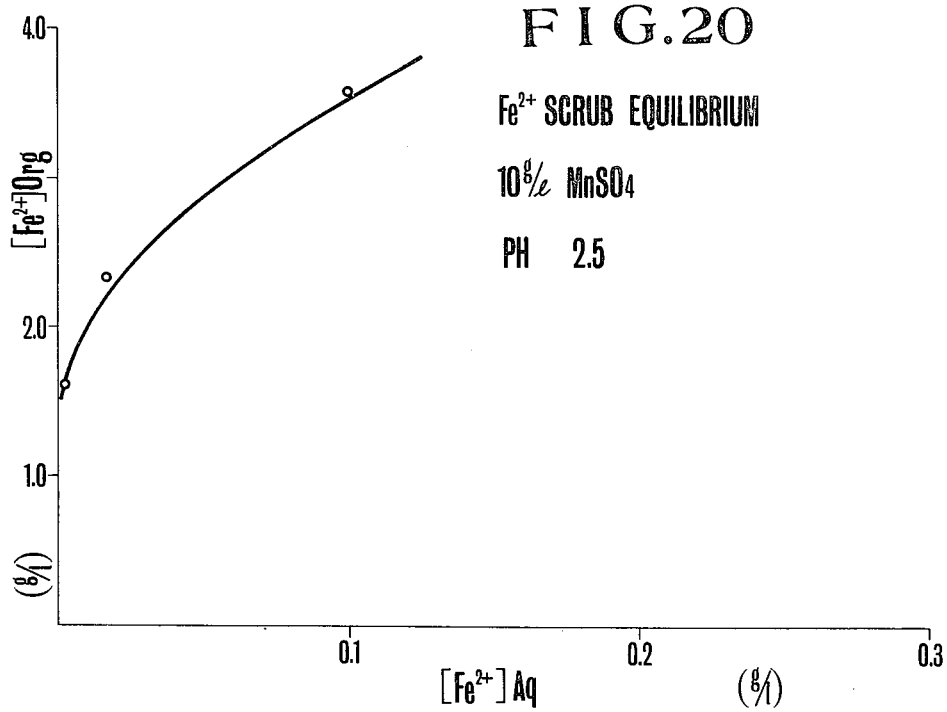
FIG. 20 is a graph showing $Fe^{2+}$ ion scrub equilibrium curve.

Values in g/l $Fe^{2+}$ ions are coextracted with $Mn^{2+}$ ions from pH values between 3.5 and 3.8. In this case, $Fe^{2+}$ ions extracted into the organic phase are scrubbed from the organic solvent (F) with $MnSO_4$ solution having a pH value of 2 - 2.5 and the concentraton of Mn in the $MnSO_4$ solution depends on the concentration of the organic solvent (F). (see FIG. 20)

| | Flow ratio | Stripping | | | | | | | | |
|---|---|---|---|---|---|---|---|---|---|---|
| | | Inlet(Org) | | | Outlet(Org) | | | (Outlet(Aq)) | | |
| Apparatus | O/A | Fe | Mn | Ti | Fe | Mn | Ti | Fe | Mn | Ti |
| 5 Stage mixer-settler | 10/1 | 0.1 | 0.49 | 0.1 | — | 0.06 | 0.6 | — | 4.8 | — 300g/l $H_2SO_4$ |
| " | 10/1 | Tr | 1.0 | 0.15 | — | 0.01 | 0.15 | — | 9.9 | — |

Values in g/l

Ti ions in the organic solvent (F) are not stripped and the organic solvent (F) is recycled. Since the Ti concentration gradually increases, one part of the organic solvent (F) is taken out the system and Ti ions in it are stripped from the organic phase with contact of the $(NH_4)_2CO_3 + NH_4OH$ solution.

(7) The Recovery of HCl by Diaphragm — Electrolysis

As the concentration of $Fe^{3+}$ ions in the back-extraction solution of the organic solvent (C) including $Fe^{3+}$ ions is impossible to be increased as shown in FIG. 13, the introduction of the above back-extraction solution into the apparatus of the recovery by the thermal-decomposition process enhances the energy cost of the recovery and consequently the back-extraction solution is introduced into the cathode compartment of diaphragm-electrolysis, and free HCl produced there by the reduction of $FeCl_3$ to $FeCl_2$ is transferred to the anode compartment and recovered.

- Continuous electrolysis test -

The back-extraction solution of the organic solvent (C) is fed into the cathode compartment by a quantitative pump and the aqueous solution of low HCl concentration, which is the back-extraction solution of the organic solvent (C) and contains no Fe ions, is fed into the anode compartment.

| Electrolysis condition | |
|---|---|
| Material of diaphragm : | Film of Tetra-fluo ethylene |
| Thickness of diaphragm : | 0.103 mm |
| Void percent diaphragm : | 55 % |
| Hole diameter diaphragm : | 0.3μ |
| Water permeability : diaphragm | 0.48 ml/cm² H |
| Electric resistance : | 0.1 Ω-cm² |
| Anode : carbon   Cathode : | Ti (Pt plating) |

Volume of anode or cathode room : 5l
Temperature : 24 – 55° C
Current density : 2 A/dm²

- Continuous test at steady state -

| | | Cathode room | | Anode room | |
|---|---|---|---|---|---|
| | | Inlet | Outlet | Inlet | Outlet |
| $Fe^{3+}$ | (g/l) | 18.0 | 0.4 | 0 | — |
| $Fe^{2+}$ | (g/l) | — | 21.0 | 0 | — |
| HCl | (g/l) | 176 | 27.4 | 50 | 178.0 |
| Liquor volume | (l/H) | 5.0 | 4.3 | 5.0 | 5.7 |

The following diaphragms besides the one described above were used.

| Material | Electric resistance | Hole dia. | Void % | Water permeab. |
|---|---|---|---|---|
| Acetic cellose | 0.05 – 0.19Ω-cm² | 0.1 – 0.4μ | 58 – 62% | 0.11–0.3 ml/cm² |
| Polypropylene | 0.12 – 0.27Ω-cm² | 0.2 – 0.4" | 38 – 45% | 0.02–0.2 ml/cm² |
| Ion exchange | 1.7 – 3.2 Ψ-cm² | Water content : 38% | | |

-continued

| Material membrane | Electric resistance | Hole dia. | Void % | Water permeab. |
|---|---|---|---|---|

The back-extraction solution of the organic solvent (E) is the concentrated solution containing 75 - 85 g/l of Fe and 200 - 240 g/l of HCl as described above. However, it is considered that the energy cost of free HCl recovery by reduction of $Fe^{2+}$ ions in the electrolysis process becomes lower than that by thermal-decomposition process because free HCl exists in the back-extraction solution of the organic solvent (E). As for the ion exchange membrane, any ion exchange membrane may be used.

The solution containing $Fe^{2+}$ ions, which consists of the solution of $Fe^{2+}$ ions produced by electro-reduction of $Fe^{3+}$ ions ($FeCl_3 \rightarrow FeCl_2 + Cl$) and the solution which is recovered by transferring the solution, containing abundant HCl unused in the back-extraction, into the anode compartment are converted to $FeCl_3$ by the oxidation with air or oxygen and one part of the Fe ions is precipitated and separated as hydrated Fe oxide or hydroxide according to the following formula.

$$2 FeCl_2 + O + H_2O = FeCl_3 + HCl + FeO(OH)$$

Both HCl and $FeCl_3$ produced in the above formula are introduced again into the cathode compartment of the electrolysis process and HCl and $Cl^-$ which are transferred to the anode compartment are recovered by reduction of $Fe^{3+}$ ions to $Fe^{2+}$ ions. When there is the apparatus of thermal-decomposition, $Fe_2O_3$ and HCl can be obtained by thermal-decomposition of the concentrated solution produced through several electrolysis processes from the viewpoint of water-balance.

Both $Fe_2O_3$ and $FeO(OH)$ obtained as mentioned above are high purity and can be utilized for ferrite and pigment without further purification.

The production of $TiO_2$ based on this invention has the following advantages.

(1) The adoption of this production method has the extreme advantages in the anti-pollution and economical cost by working out the problem of $FeSO_4 \cdot nH_2O$ — treatment which has been the most troublesome process.

(2) The recovery of valuable metals, such, as V, Nb and Mn, etc., contained in a small amount is possible by regenerating and reusing the waste acid economically, including a large amount of heavy metal ions in 20 - 40% $H_2SO_4$ after the hydrolysis process. The product of the individual valuable metal is recovered in high purity.

(3) The metals such as, Cr whose existence in the raw materials is undesirable can be fractionally recovered with solvent extraction techniques from the aqueous solution before the hydrolysis process and consequently the selection of the raw materials is very easy.

(4) The product-purity of the hydrated Fe oxide and hydroxide by-produced in the acid recovery process is very high as used not only pig iron — raw materials, but also for valuable ferrite or pigment and consequently the economical value is enhanced.

(5) The whole system is built up as a closed-circuit and the protection of the environment is possible because the great part of the used reagent is recovered or used as a product.

What is claimed is:

1. In a method for obtaining titanium dioxide from titanium-containing raw materials wherein the materials are dissolved in sulfuric acid to form an aqueous solution of sulfuric acid containing dissolved titanium and other metals selected from the group consisting of iron, V, Mn, Cr, and Nb, and then forming a precipitate of $FeSO_4 \cdot nH_2O$ and the titanium in the solution is isolated and subsequently recovered as titanium dioxide from the aqueous solution, the improvement which comprises:

1. extracting $Cr^{3+}$ and $Nb^{5+}$ ions from the aqueous solution by contacting the aqueous solution with a first organic solvent selected from the group consisting of primary, secondary, tertiary and quaternary amines;
2. separating the aqueous solution resulting from step (1) and separating a major portion of the titanium ion in the solution by hydrolysis;
3. separating the aqueous solution resulting from the hydrolysis treatment of step (2) and extracting the titanium ions remaining in the aqueous solution with a second organic solvent selected from the group consisting of alkyl phosphoric acids mixed with from 2 to 5 percent higher alcohols and aromatic, aliphatic or paraffinic hydrocarbons as a diluent;
4. separating the aqueous solution resulting from the extraction of step (3), oxidizing the $Fe^{+2}$ ions therein to $Fe^{+3}$ ions and then extracting the $Fe^{+3}$ ions with a third organic solvent selected from the group consisting of alkyl phosphoric acids in combination with from 2 to 5 percent higher alcohols and aromatic, aliphatic or paraffinic hydrocarbons as a diluent;
5. separating the aqueous solution resulting from step (4) and extracting the vanadium ions and other remaining heavy metal ions with a fourth organic solvent selected from the group consisting of primary, secondary, tertiary or quaternary amines in combination with from 2 to 5 percent higher alcohols and aromatic, aliphatic or paraffinic hydrocarbons as a diluent; and then
6. recovering, regenerating and concentrating the sulfuric acid remaining in the aqueous solution resulting from step (5).

2. The process of claim 1 wherein the second organic solvent after the extraction in step 3 is scrubbed with an aqueous solution of $H_2SO_4$, $HNO_3$ or HCl whereby the Mn, V and Fe ions contained therein are removed, and then the thus treated second organic solvent is back-extracted with an aqueous solution containing $(NH_4)_2CO_3$, $(NH_4)SO_4$, $NH_4F$ or a combination of $NH_4NO_3$ and $NH_3$ to transfer the $Ti^{+4}$ ions into the aqueous solution and then separating the remaining third solvent and then contacting said separated third solvent with $H_2SO_4$ and extracting any $Cr^{3+}$ ions in the thus treated solvent by washing with an aqueous solution of HCl and $H_2O_2$ or HCl and NaCl.

3. The process of claim 2 therein the $FeSO_4 \cdot nH_2O$ is dissolved in the aqueous solution from step 3 prior to the extraction with the third solvent.

4. The process of claim 3 wherein after dissolution of the $FeSO_4 \cdot nH_2O$ in aqueous solution from step 3, $Mn^{2+}$ ions in the resulting solution are extracted with a sixth organic solvent leaving the $Fe^{+2}$ ions in the aqueous solution from said extraction for the oxidation treatment.

5. The process of claim 4 wherein the $Fe^{+3}$ ions in the third solvent are extracted by contacting said third solvent with said sixth solvent and then stripping said sixth solvent with water.

6. The process of claim 4 wherein a solvent selected from the group consisting of the third extracting solvent, the sixth extracting solvent and combinations thereof, said solvents containing said $Fe^{3+}$ ions, is introduced into the cathode compartment of a diaphragm-electrolysis unit and subjected to electrolysis therein whereby the $Fe^{+3}$ ions are reduced to $Fe^{+2}$ and free acid is transferred to the anode compartment and hydrated Fe oxide or hydroxide is recovered by contacting the aqueous solution in the cathode compartment with air or oxygen.

7. In a method for obtaining titanium dioxide from titanium-containing raw materials wherein the materials are dissolved in sulfuric acid to form an aqueous solution of sulfuric acid containing dissolved titanium and other metals selected from the group consisting of iron, V, Mn, Cr, and Nb, and then forming a precipitate of $FeSO_4 \cdot nH_2O$ and the titanium in the solution is isolated and subsequently recovered as titanium dioxide from the aqueous solution, the improvement which comprises:

1. extracting $Cr^{3+}$ and $Nb^{5+}$ ions from the aqueous solution by contacting the aqueous solution with a first organic solvent selected from the group consisting of primary, secondary, tertiary and quaternary amines;
2. separating the aqueous solution resulting from step 1. and separating a major portion of the titanium ion in the solution by hydrolysis;
3. separating the aqueous solution resulting from the hydrolysis treatment of step 2. and extracting the titanium ions remaining in the aqueous solution with a second organic solvent selected from the group consisting of alkyl phosphoric acids mixed with from 2 to 5 percent higher alcohols and aromatic, aliphatic or paraffinic hydrocarbons as a diluent;
4. separating the aqueous solution resulting from the extracting of step 3., oxidizing the $Fe^{+2}$ ions therein to $Fe^{+3}$ ions, adding HCl to the resulting solution to form an iron chloride complex and then extracting the complex from the solution with a fifth organic solvent suitable for dissolving and extracting said complex;
5. separating the aqueous solution resulting from step 4. and extracting the vanadium and other remaining heavy metal ions with a fourth organic solvent selected from the group consisting of primary, secondary, tertiary, or quaternary amines, in combination with from 2 to 5 percent higher alcohols and aromatic, aliphatic or paraffinic hydrocarbons as a diluent; and then
6. recovering, regenerating and concentrating the sulfuric acid remaining in the aqueous solution resulting from step 5.

* * * * *

UNITED STATES PATENT OFFICE
CERTIFICATE OF CORRECTION

Patent No. 4,082,832  Dated April 4, 1978

Inventor(s) Morio Watanabe, S. Nishimura

It is certified that error appears in the above-identified patent and that said Letters Patent are hereby corrected as shown below:

In the heading of the Patent, [30] should read as follows

[30] Foreign Application Priority Data

```
May 6, 1975    Japan.........50-55048
Jul.21, 1975   Japan.........50-89433
Dec.4, 1975    Japan.........50-144861
Jan.16, 1976   Japan.........51-3929
```

Signed and Sealed this

Twenty-fifth Day of July 1978

[SEAL]

Attest:

RUTH C. MASON
Attesting Officer

DONALD W. BANNER
Commissioner of Patents and Trademarks